May 26, 1925.  
H. FREI  
1,539,662  
ELECTRIC ALTERNATING CURRENT MACHINE  
Filed Feb. 13, 1922  2 Sheets-Sheet 1

Inventor:
Heinrich Frei,
By Henry Orth
atty.

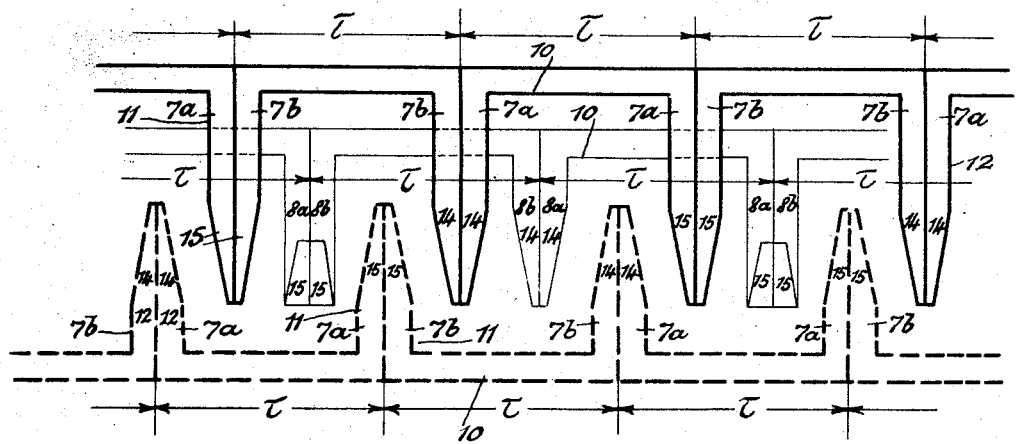

Patented May 26, 1925.

1,539,662

UNITED STATES PATENT OFFICE.

HEINRICH FREI, OF OBERENGSTRINGEN, NEAR ZURICH, SWITZERLAND.

ELECTRIC ALTERNATING-CURRENT MACHINE.

Application filed February 13, 1922. Serial No. 536,269.

*To all whom it may concern:*

Be it known that I, HEINRICH FREI, a citizen of the Republic of Switzerland, residing at Oberengstringen, near Zurich, Switzerland, have invented certain new and useful Improvements in Electric Alternating-Current Machines, of which the following is a specification, reference being had therein to the accompanying drawing.

The invention has reference to improvements in electric machines and particularly to alternating current motors.

Alternating current motors are known having two sets of field magnets each of said sets consisting of a plurality of bipolar magnets isolated from each other, the pole pieces of each magnet being located one ahead of the other considered circumferentially and the single magnets of the respective sets being so arranged that each magnet of each set is located in between two adjacent polar projections of the magnets of the other set, coils being provided for the respective sets one of which is adapted for exciting all the magnets of one set and the other coil for exciting all the magnets of the other set.

Motors of the above mentioned type present besides a low electrical efficiency and a low power factor, the principal disadvantage that in consequence of the arrangement of the individual magnets these motors could not be designed as three-phase motors. It was further impossible to attain symmetrical production of a magnetic field in the armature, which feature is absolutely necessary for an economic design of the motor and for a good utilization of the armature cross-sectional area.

These points are attained by the present invention, which consists of an alternating current machine the inductor of which comprises three sets of magnets consisting of packets or bundles of magnetic sheets which are excited by three separate coaxially arranged ring coils, the bundles of magnetic sheets or laminæ of each magnet being symmetrically distributed as the axial planes passing through the poles at the pole face and the magnets of the individual sets being so located that the heads of the bundles of sheets of one set of magnets forming the pole faces are located between the heads of the bundles of sheets of the other sets.

This arrangement enables one to attain very favorable conditions for three-phase current machines especially for three-phase motors with squirrel cage rotors. Preferably the rotor is designed as a bell-shaped external rotor, whereby a very good cooling effect is attained. It is further advantageous to have the armature bars fixed to the armature and to short circuit rings by inserting these parts in a casting of a metal such as aluminium.

By means of a simple changing of the pole connections and connecting the coils in parallel a three-phase motor of the above mentioned type may be utilized as a single-phase motor whereby the speed and the output are approximately reduced in the ratio 3:1.

Constructional examples of the object of the invention are illustrated on the accompanying drawings, in which:

Fig. 3 is a developed diagram of the pole face of the inductor having four bundles of sheets for each pole and each phase;

Fig. 4 is an elevation view of the inductor showing the arrangement of the bundles of sheets four bundles of magnetic sheets being provided for each pole and each phase;

Figs. 5 and 6 show details of the bundles of dynamo sheets and

Fig. 7 is a diagrammatic development of the pole heads 14 and 15 of the three magnet sets.

Figure 1:
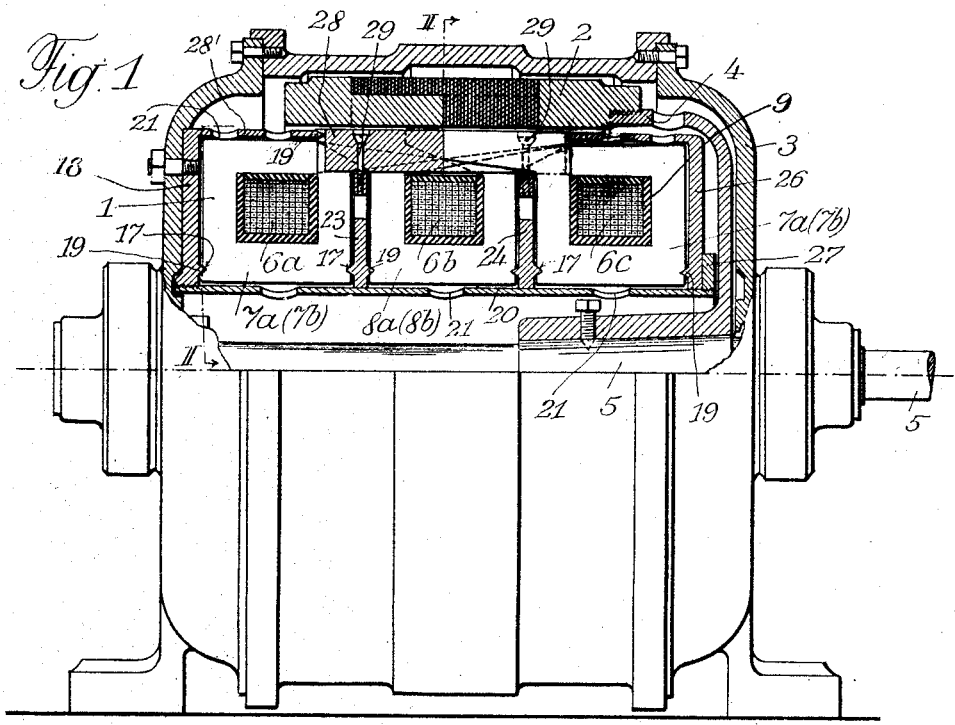
Fig. 1 is a side elevation of a three-phase motor the upper half of which is shown in vertical sections, along lines I—I and lines I'—I' of Fig. 2.
Figure 2:
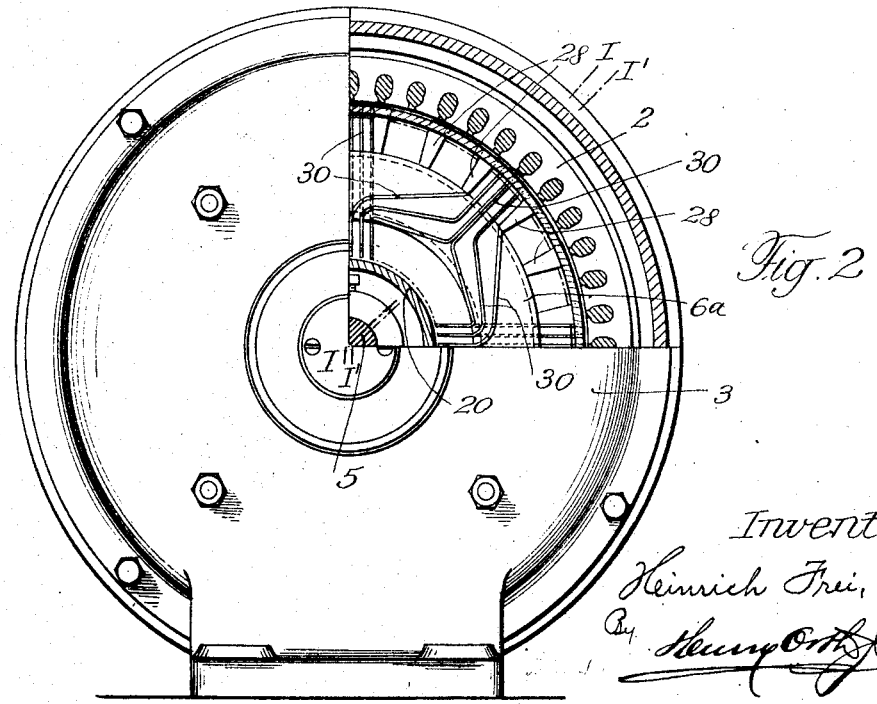
Fig. 2 is a front elevation of the motor, the upper right hand quarter of this figure being a section along line II—II of Fig. 1.

With the asynchronous motor illustrated in Figs. 1 and 2, the inductor 1 is arranged internally and the armature 2 is arranged externally. The casing 3 is built of three parts. The armature comprises a bell-shaped part 4 to which there is rigidly screwed the armature core of magnetic sheets of laminæ, the armature bars and the short circuit rings being united by a metal cast around these parts. The bell-shaped part 4 is rigidly secured to the shaft 5, so that the armature revolves with the rotating shaft 5.

The stator forming the inductor consists mainly of three concentric ring coils 6$^a$, 6$^b$, 6$^c$, located within packets or bundles of magnetic sheets 7$^a$, 7$^b$ and 8$^a$, 8$^b$, the ring coils being held in the proper position by the means described hereinafter. Each of the ring coils consists of the coil body 9 of a U-shaped radial cross-section made of insulating material of a sufficiently high mechanical resistance in which body the insulated material for instance the wire or the like for providing for the required ampere-turns is placed by being wound up into the trough formed by the coil body. The U-shaped ring 9 is then closed by a cylindrical cover of insulating material. The packets of magetic sheets 7ª, 7ᵇ and 8ª, 8ᵇ are composed of a number of sheet elements, which are illustrated in elevation in Figs. 5 and 6, whilst Fig. 4 shows the packets in position in a side view. Each sheet element is made of one piece and consists of an inner part 10 with two shanks 11 and 12, the former being shorter than the latter. The shanks 11 and 12 are provided with extensions 14, 15, a free space 16 is present in the centre. Notches 17 are provided on the sheet elements. The shanks 12 are bent either to the left or to the right off the lines indicated by dots in Figs. 5 and 6 so that shapes are formed as illustrated in Fig. 4. According to the number of pole pieces the shank 12 is made longer or shorter and is bent through a larger or smaller angle with respect to the shank 11. In the constructional form illustrated in Fig. 4 an eight pole motor is shown. By the combination of similarly shaped sheet elements, which may be suitably isolated, packets of sheets 7ª, 8ª, and 7ᵇ, 8ᵇ respectively are provided which are formed symmetrically but extending in opposite directions. A plurality of sheet elements illustrated in Fig. 5 are combined to form packets for the outer ring coils or phases, whilst a plurality of the sheet elements shown in Fig 6 are adapted to form the packets for the middle phase. Two paths through the armature for the magnetic lines leaving a pole of the inductor present themselves, which paths are symmetrical to the radial plane passing through the centre of the pole. To this end half of each packet or bundle on each ring coil is bent to one side of the centre of the pole when looking at the circumference, and the other half is bent to the other side of the centre of the pole.

The path of the magnetic lines of each magnetic circuit in each phase is therefore the following: The magnetic lines pass from the pole heads of the straight shanks of the plate bundles through the air gap into the armature and divide into two symmetrical branches which flow through the armature over the pole pitch in two circumferential directions that are opposite to each other, whereafter they return through the air gap to the pole heads of the bent shanks and complete the magnetic circuit by flowing through the inner part of each plate. In this manner the armature is permeated magnetically along the whole of its circumference but only with a magnetic flux of half the strength of a pole.

With arrangements according to the present invention, i. e., with the symmetrical distribution of the magnetic lines of each pole of a ring coil, a much better utilization of the material in the armature, i. e., of the iron and of the conductors, is obtained than with the above mentioned one sided flow of the magnetic lines.

The packets of sheets 7ª, 7ᵇ and 8ª, 8ᵇ are then placed over the ring coils 6ª, 6ᵇ and 6ᶜ respectively so that the ring coils occupy the free space 16 of the sheet elements and packets.

A bush 20 is concentrically arranged to the shaft 5 and fixed by means of a disc 18 of an angular cross-section screwed to the bush to the side part of the casing 3. Apertures 21 for ventilation purposes are provided along the circumference of the bush 20. This disc 18 and its outer cylindrical wall 28' enclosing the packets 7ª being provided with projections 19 that engage with the recesses 17 of the packets of sheets. 23 and 24 denote two discs that are fitted to the bush 20. 26 is a disc of angular cross-section similar to disc 18 which encloses the packets 7ª and 7ᵇ. The packets 8ª, 8ᵇ forming the middle phase are arranged between the discs 23 and 24. The discs 23, 24 and 26 are provided with projections 19 for engagement with the notches 17 of the packets. A ring nut 27 is screwed onto the bush 20 for pressing the disc 26 against the packet. The ring coils 6ª, 6ᵇ, 6ᶜ together with the packets of sheets mounted thereon are consecutively assembled on the bush 20 and pressed firmly together by means of the disc 26 being tightly screwed against the packet. Between the adjacent heads of the packets of magnetic sheets wedge shaped distance pieces 28 of non-magnetic material are inserted for fixing the packet heads, i. e. the pole faces in position. The distance pieces 28 are secured by means of screws 29 to the discs 23 and 24 respectively. The packets forming one phase can be subdivided by press-spahn insertions 30 to avoid eddy-currents as has been shown for one phase in Fig. 2 of the drawing.

The three ring coils are each connected to one phase of the three-phase current system and alternating fields are generated in a known manner.

Instead of designing the inductor as stator, i. e. as the stationary part, it may be secured as rotor to the shaft and the armature may act as stator and is in this case connected to the casing.

Fig. 3 of the drawings illustrates a developed diagram of the pole face formed by the heads of the packets of magnetic sheets of the inductor. As may be seen from the drawing each pole face of each phase is composed of the heads of four packets, which are so located that in between two adjacent heads of one phase one head of a packet of each of the other two phases is inserted. The thick full lines represent the bundles of one of the outer phases, the thick dotted lines indicate the laminæ or bundles of the other outer phase and the thin full lines denote the laminæ or bundles of the inner phase, the third phase. The heads of the packets of magnetic sheets forming the alternating pole face are symmetrically distributed, so that the heads of the packets or bundles of magnetic sheets of one ring coil are arranged in between the heads of the packets of the other two ring coils.

The inductor shown in Fig. 4 is an eight pole inductor. For each ring coil i. e. for each phase four bundles of laminæ or packets 7ª and four packets 7ᵇ symmetrically arranged to the former but bent in the opposite direction are provided. In this figure the ring coils and the packets 7ª and 7ᵇ surrounding the ring coils are illustrated; in the lower half of Fig. 4 only the packets of an outer face with the long and sharply bent shanks 12 that pass above the coil are shown in full lines, while the shorter shanks 11 that pass below the coil are shown in dotted lines. In the upper half of Fig. 4 the packets of all three phases that are distanced from each other by means of the wedge shaped distance pieces 28 are illustrated. The thin lines represent therein the packets 8ª, 8ᵇ of the middle phase, the thick lines and the dotted lines indicate the packets 7ª, 7ᵇ, 9ª and 9ᵇ respectively of the two outer phases, whereby centres of the pole pieces of the individual phases are at a distance from each other that equals to one third of the pitch of the pole pieces.

In order to take into consideration the thickness of the packets 7ª, 7ᵇ, 8ª, 8ᵇ the single sheets of which are preferably stamped with a die the shanks 12 with greater length have to be bent to a very small radius of curvature to avoid that some of the sheets project beyond the end faces.

In Fig. 7 the diagrammatic development of the pole heads 14, 15 of three magnet sets, the heads tapering in the axial direction is shown; illustrating the cyclic sequence of the phases, assuming the pate bundles to be arranged as illustrated in Fig. 4. It may be seen from this figure the manner in which the pole heads of the outer and inner magnet sets overlap. In order to reduce the leakage lines from pole to pole and to improve the power factor an appropriate overlapping is desirable, which is attained at the tapering portions of the pole heads.

Single phase motors may be designed in exactly the same manner as has been hereinbefore described for the three phase motors. By suitably changing the connection of the magnet sets the motor connected to the three-phase system can be worked as a one-phase motor running at a speed and giving an output that is reduced approximately in the ratio of 3:1 as compared with the motor working as three-phase motor. This changing of the connection can be carried out in a simple manner when the motor is connected to a three-phase system having a neutral wire.

The principal advantages of an alternating motor built according to the present invention are the following:

The winding is simpler and cheaper than the hitherto known constructions as it can be simply wound on a drum in contradistinction to the usual bar winding and former-winding that requires exact manual labour.

Motors of this type are very light and are therefore well suited for portable constructions. Induction motors running at low speeds may advantageously be built according to the invention and are much smaller than the hitherto known constructions which necessitated large diameters of the inductor and of the armature owing to the high number of slots required for multipolar motors. The design according to the invention particularly adapts itself to slow speed small motors.

I claim:

1. In an alternating current machine, three sets of magnets consisting of packets of magnetic sheets and three separate coaxially arranged ring coils for exciting said magnets, the packets of magnetic sheets of each magnet being symmetrically arranged to the centres of the pole pieces in the pole faces and the magnets of the individual sets being so closely located that the heads of the packets forming the pole faces of one set of magnets are arranged between the heads of the packets of the other sets, forming thereby a substantially uniform concentric polar surface and an armature member with appropriate symmetrically spaced exciting windings, said armature being within the magnetic field of the polar surfaces of the magnetic element.

2. In an alternating current machine, three sets of magnets consisting of packets of magnetic sheets each element of the sheets forming said packets being made of one piece, and three separate coaxially arranged ring coils for exciting said magnets, the packets of magnetic sheets of each magnet being symmetrically arranged to the centres of the pole pieces in the pole faces and the magnets of the individual sets being so located that the heads of the packets forming the pole faces of one set of magnets are closely arranged between the heads of the packets of the other sets, so as to form a substantially uniform polar surface, with an armature having appropriate symmetrically spaced windings.

3. In an alternating current machine, three sets of magnets consisting of packets of magnetic sheets, each element of the sheets forming said packets being made of one piece and having tapering extended parts forming the heads of the packets, and three separate coaxially arranged ring coils for exciting said magnets, the packets of magnetic sheets of each magnet being symmetrically arranged to the centres of the pole pieces in the pole faces and the magnets of the individual sets being so located that the heads of the packets consisting of said tapered extending parts of the sheet elements and forming the pole faces of one set of magnets are arranged between the heads of the packets of the other sets, the tapering extended parts of the sheet elements of the respective sets overlapping each other to an appropriate amount to reduce the leakage.

4. In an alternating current machine, three sets of magnets consisting of packets of magnetic sheets and three separate coaxially arranged ring coils for exciting said magnets, the packets of magnetic sheets of each magnet being symmetrically arranged to the centres of the pole pieces in the pole faces and the magnets of the individual sets being so located that the heads of the packets forming the pole faces of one set of magnets are arranged between the heads of the packets of the other sets, and a bell shaped armature enclosing the inductor and acting as rotor.

5. An alternating current single or multiphase machine comprising concentrically arranged (with relation to the axis of the machine) exciting coils, for each phase, contained within appropriate magnetic bodies, the pole pieces of said bodies excited by each set of coils being symmetrically arranged between the pole pieces of the other sets and forming substantially uniform circumferential polar faces, and a rotor or armature element with appropriate symmetrically spaced exciting windings arranged within the magnetic field of the stator element.

6. An alternating current single or multiphase induction machine, comprising concentrically arranged (with relation to the axis of the machine) exciting coils, for each phase, contained within appropriate magnetic bodies, the pole pieces of said bodies excited by each set of coils being symmetrically arranged between the pole pieces of the other sets and forming substantially uniform circumferential polar faces, and an exterior armature or rotor member having symmetrically spaced closed induced windings within the magnetic field of the stator.

7. In a three phase alternating current machine, an inductor comprising three separate coaxially arranged ring coils, one for each phase, and a set of packets of magnetic sheets arranged around each ring coil and provided with pole heads forming an alternating pole face that is concentric to the axis of the machine, and an armature; one half of each packet of magnetic sheets on each ring coil being bent to one side and the other half to the other side when looking at the pole piece face, whereby the magnetic lines leaving a pole piece have two paths through the armature that are symmetrical to the radial plane passing through the centre of the pole piece.

8. In a three phase machine, an inductor comprising three separate coaxially arranged ring coils, one for each phase, and a set of packets of magnetic sheets arranged around each ring coil and provided with pole heads forming an alternating pole piece face that is concentric to the axis of the machine, and an outer armature; one half of each packet of magnetic sheets on each ring coil being bent to one side and the other half to the other side when looking at the pole piece face, whereby the magnetic lines leaving a pole have two paths through the armature that are symmetrical to the radial plane passing through the centre of the pole piece.

9. In a three phase machine, an inductor stator comprising three separate coaxially arranged ring coils, one for each phase, and a set of packets of magnetic sheets arranged around each ring coil and provided with pole piece heads forming an alternating pole piece face that is concentric to the axis of the machine, and an outer armature rotor, one half of each packet of magnetic sheets on each ring coil being bent to one side and the other half to the other side when looking at the pole piece face, whereby the magnetic lines leaving a pole piece have two paths through the armature that are symmetrical to the radial plane passing through the centre of the pole piece.

10. In a three phase machine, an inductor comprising three separate coaxially arranged ring coils for each phase, and a set of packets of magnetic sheets arranged around each ring coil and provided with pole heads forming an alternating pole piece face that is concentric to the axis of the machine, and an outer armature, the magnetic sheet elements forming the packets being made of one piece and comprising an inner part to which shanks join which carry the pole piece heads, one half of the elements of each packet on each ring coil being bent to one side and the other half to the other side when looking at the pole piece face, whereby the magnetic lines leaving a pole piece have two paths through the armature that are symmetrical to the radial plane passing through the centre of the pole piece.

11. In a three phase machine, an inductor stator comprising three separate coaxially arranged ring coils, one for each phase, and a set of packets of magnetic sheets arranged around each ring coil and provided with pole heads forming an alternating pole piece face that is concentric to the axis of the machine, and an outer armature rotor, the sheet iron elements forming the packets being made of one piece comprising an inner part to which shanks join which carry the outer pole piece heads, the latter being tapered in the axial direction so that the pole piece heads in the cyclic sequence overlap to an appropriate extent for reducing the leakage, one half of the elements of each packet of magnetic sheets on each ring coil being bent to one side and the other half to the other side when looking at the pole piece face, whereby the magnetic lines leaving a pole piece have two paths through the armature that are symmetrical to the radial plane passing through the centre of the pole piece.

In testimony whereof I affix my signature.

HEINRICH FREI.